Figure 1:
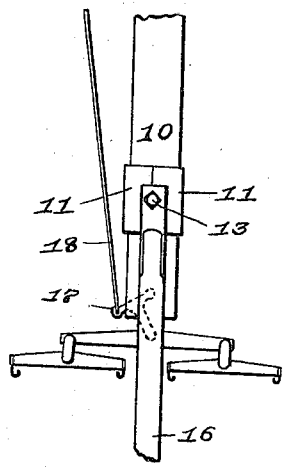
Figure 2:
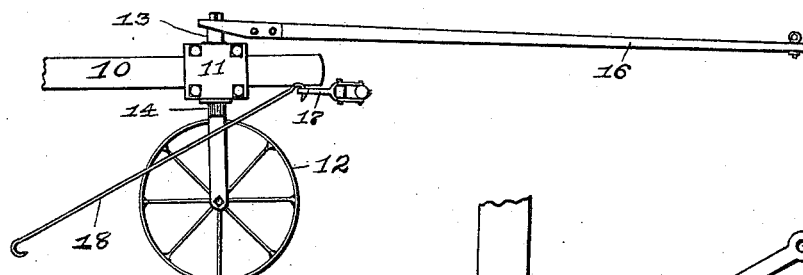
Figure 3:
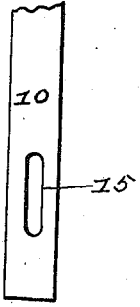
Figure 4:
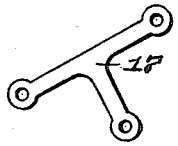

A. STAHLY.
TRUCK FOR MOWING MACHINES.
APPLICATION FILED MAR. 12, 1910.

987,836.

Patented Mar. 28, 1911.

Witnesses
Orville L. Page
B. M. Sedgwick

Inventor
Alexander Stahly
By Bell & Roe, Atty.

UNITED STATES PATENT OFFICE.

ALEXANDER STAHLY, OF OCHEYEDAN, IOWA.

TRUCK FOR MOWING-MACHINES.

987,836.  Specification of Letters Patent.  Patented Mar. 28, 1911.

Application filed March 12, 1910. Serial No. 548,985.

*To all whom it may concern:*

Be it known that I, ALEXANDER STAHLY, a citizen of the United States, residing in Ocheyedan, county of Osceola, and State of Iowa, have invented a new and useful Improvement in Trucks for Mowing-Machines, of which the following is a specification.

The object of my invention is to provide a truck for a mowing machine, simple, strong, durable and practically inexpensive in construction, and which will be adapted to carry the weight of the mower and guide it when turning, and the like.

A further object is to provide a device of this character which will be so constructed as to take the weight off the horses' necks and permit them to pull the mower by the tugs, when they are in the act of turning.

My invention consists of certain details of construction, hereinafter set forth, pointed out in my claim, and illustrated in the accompanying drawings, in which—

Figure I shows a plan view of my truck secured to a stub tongue of a mower; Fig. II shows a side elevation view of the same; Fig. III shows a detail view of a portion of the stub tongue; and, Fig. IV shows a detail view of the evener strap I employ.

Referring to the accompanying drawings the reference numeral 10 is used to indicate a stub tongue, which is designed to be secured to, and project forwardly from, a mower, but as the mower is of any ordinary construction and forms no part of this invention, it has not been shown.

Adjustably secured on the stub tongue, by means of clamping members 11 forming a boxing thereon, is a one wheel truck, the wheel 12 being provided with, and rotatably secured to, an upwardly projecting shaft 13, said shaft being designed for rotary movement within the boxing, and provided with a lug, or ferrule, 14 above the wheel on which the boxing is designed to rest. Said clamping members 11 constituting the housing are provided with transverse bolts, which pass above and below the stub-tongue 10, thereby rendering the housing adjustable on the latter. Obviously the stub tongue, or pole, is provided with an oblong slot 15, through which the shaft 13 extends, and the said shaft is held true by an engagement with an orifice in the top and also in the base of the boxing. The upper extremity of the shaft is provided with a square head (or the head may be of any shape except circular) to be received by an orifice of like shape, at the rear end of a tongue 16, and said tongue is secured to said truck by this means.

Secured on the lower surface of stub tongue, and near the forward extremity thereof, is an evener strap 17 which is of the construction shown in Fig. IV and provided with three orifices disposed as shown. The evener strap is secured for rotary movement to the stub tongue by means of a bolt passing through the tongue and through one of the orifices in the said evener strap. The double tree is secured to the evener strap by means of a bolt passing therethrough and also through one of the aforesaid orifices.

The numeral 18 indicates a rod, provided with a hook on each end, one of said hooks being designed to secure the rod to the evener strap and the other hook being designed to secure the rod to the sickle bar.

It will be observed that when the machine is to be used the horses are hitched to the stub tongue of the mower and also to the tongue which is secured to the truck. That is to say, the tongue of the truck is supported by the neckyoke, and the doubletrees, to which the traces are hitched are attached to the stub-shaft through the medium of the evener strap 17. By this arrangement it is obvious that the wheel truck supports the weight of the tongue which is secured to the neckyoke and the pull all comes on the stub tongue and, as the truck is secured to the stub tongue, the pull and the weight are both on the truck so that there is no stress or strain on the horses' necks. In turning the machine the tongue, supported by the neckyoke serves as a guide to the truck.

Having thus described my invention what I claim and desire to secure by Letters Patent of the United States is:

A truck for mowing machines, comprising, in combination, a stub tongue having a longitudinal slot vertically disposed therein, a pair of similarly formed members each adapted to inclose a portion of said stub tongue and forming a slidable housing, on said tongue adjacent said slot, said housing having upper and lower apertures registering with said slot, a wheel truck having a wheel secured therein and having an upwardly extending shaft projecting through said upper and lower apertures, a tongue having its rear end rigidly carried by the upper end of said wheel truck shaft, and means for adjustably fastening said housing to said stub tongue around the slotted portion.

ALEXANDER STAHLY.

Witnesses:
C. R. RICHARDS,
W. D. SHUTTLEWARTH.